United States Patent [19]

Tatara

[11] Patent Number: 5,751,770
[45] Date of Patent: May 12, 1998

[54] DATA TRANSMISSION SYSTEM

[75] Inventor: Hirokazu Tatara, Shizuoka, Japan

[73] Assignee: Yazaki Corporation, Tokyo, Japan

[21] Appl. No.: 616,005

[22] Filed: Mar. 14, 1996

[30] Foreign Application Priority Data

Mar. 17, 1995 [JP] Japan ................ 7-058898

[51] Int. Cl.$^6$ ................ H03K 7/08; H03K 9/08
[52] U.S. Cl. ............ 375/238; 375/369; 370/205
[58] Field of Search ................ 375/238, 369, 375/259; 370/212, 503, 205

[56] References Cited

U.S. PATENT DOCUMENTS

4,748,643  5/1988  Setoguchi et al. .............. 375/369
4,872,186  10/1989  Gerhart et al. .............. 375/369

*Primary Examiner*—Stephen Chin
*Assistant Examiner*—Bryan Webster
*Attorney, Agent, or Firm*—Armstrong, Westerman, Hattori, McLeland & Naughton

[57] ABSTRACT

The object of the present invention is to provide a data transmission system, wherein even when more than two among a plurality of stations interconnected by one common transmission line try to communicate mutually by a start-stop transmission PWM mode, if the phases within a bit in the data of the own station and a corresponding bit of the data on the transmission line which has been received through a plurality of own station are compared and they coincide with each other as the result thereof, then the own station continues transmitting the data, while otherwise it comes to stop transmitting, whereby even if there is a difference between the clock frequency of the own station and that of another station, the phases in the corresponding bits of the two different data can be smoothly compared. In order to achieve the above objective, the present invention provides an external synchronizing means which, when a rising edge of the data on the transmission line received through a filtering means (RX data) is detected during the period in which the last phase of the data of the own station (TX data) is being transmitted, forces to transmit the next bit in the TX data in synchronization with the detection of the rising edge of the RX data.

3 Claims, 6 Drawing Sheets

FIG. 1

FIG. 4A SYSTEM CLOCK
FIG. 4B 「1」
FIG. 4C 「0」

FIG. 5

DATA TRANSMISSION SYSTEM

BACKGROUND OF THE INVENTION

1. Field of the Invention

The present invention relates to a data transmission system, and more particularly to a system which is capable of preventing a conflict of data when a plurality of data are to be transmitted on a common transmission line.

2. Description of the Prior Art

Figure 4A:
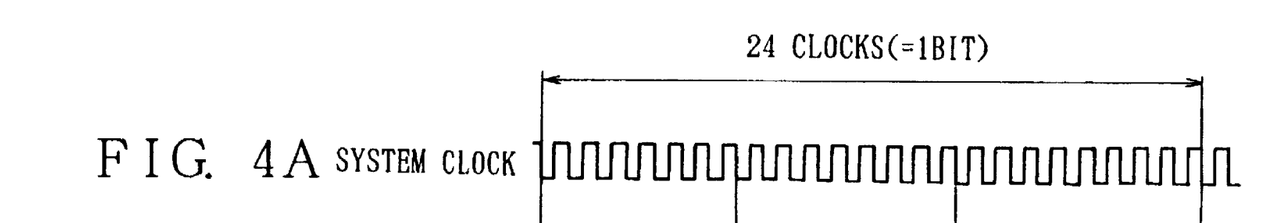
FIGS. 4A to 4C are illustrations showing a bit format adopted in the data transmission system of the present invention.
Figure 4B:
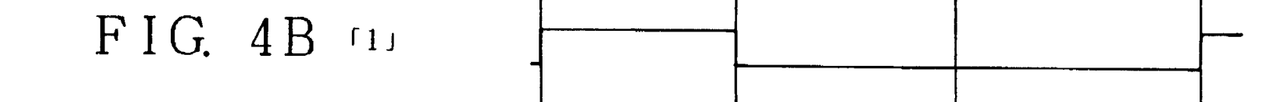
Figure 4C:
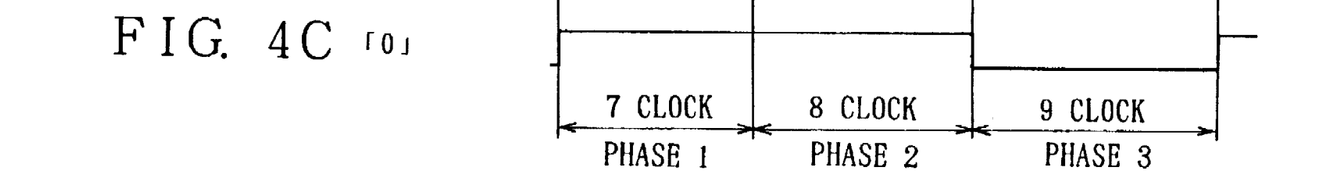
Figure 5:
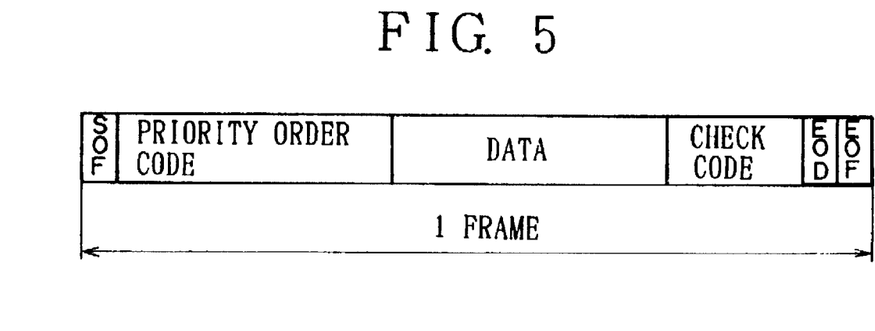
FIG. 5 is an illustration showing a data frame adopted in the data transmission system of the present invention.

Conventionally, there has been a data transmission system wherein a plurality of data transmitting stations are connected by a common transmission line through which data are transmitted in a start-stop transmission PWM (Pulse-Width Modulation) mode. In this mode as shown in FIG. 4A, one bit is composed of 24 system clocks, wherein when only a first phase composed of a predetermined 7 system clocks is set to "High" level, a value "1" is set, whereas when the second phase composed of 8 system clocks is also set to "High" level in addition to the first phase, then a value "0" is set. With this construction, when two stations are sending data of respectively value "0" and "1" on the transmission line, the station having data of value "0" acquires a priority to use the transmission line.

Further, by this transmission mode, the successive bit next to the start bit SOF having the above data frame is used as a priority judging code (including a destination address) for deciding a priority order in data transmission, whereby when more than two stations start sending data at the same time, the data having "0" in its priority code after the start bit SOF continues transmitting the data, and the data having "1" on the other hand stops the transmission thereof in order to prevent a conflict with other data.

Figures 6A, 6B:
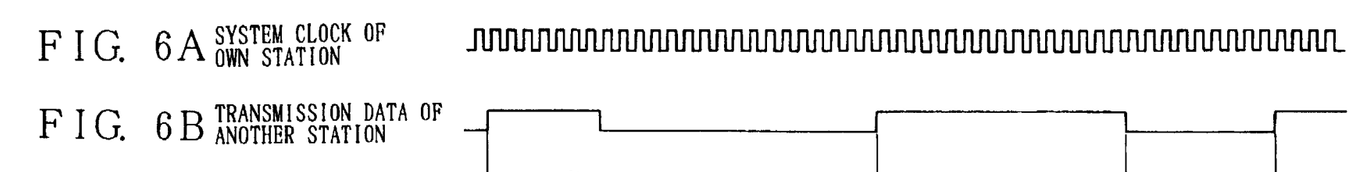
FIGS. 6A to 6G are timing charts explaining altogether the timing for sampling, comparing and for stopping the data transmission in the prior data transmission system and in the system of the present invention.
Figures 6C, 6D:
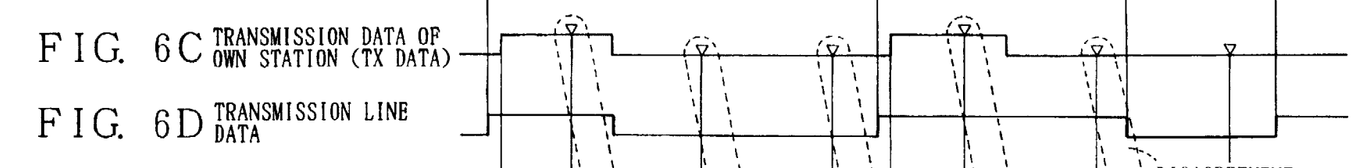
Figure 6E:
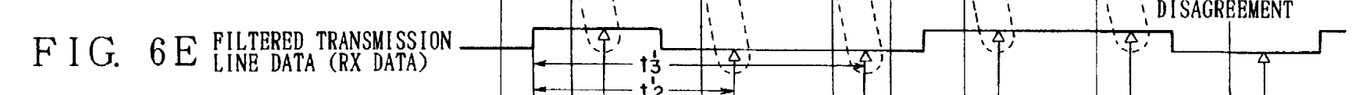
Figure 6F:
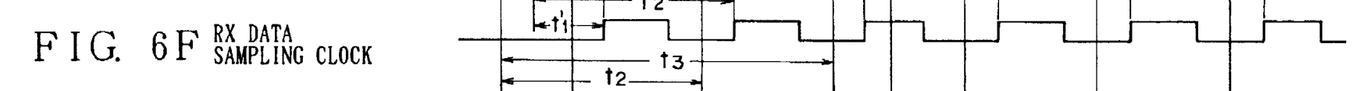
Figure 6G:
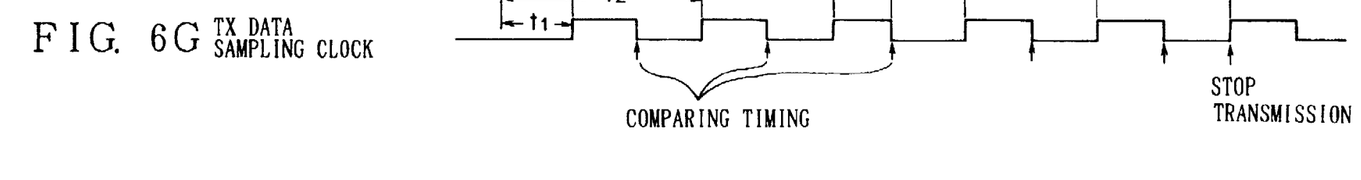
Figure 7A:
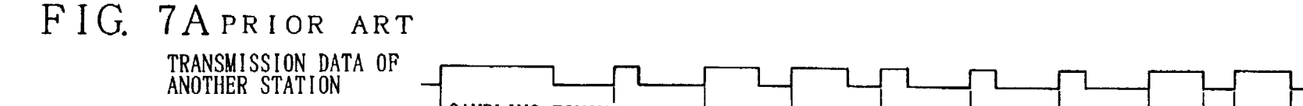
FIGS. 7A to 7D are timing charts explaining the problems observed in the prior data transmission system.
Figure 7B:
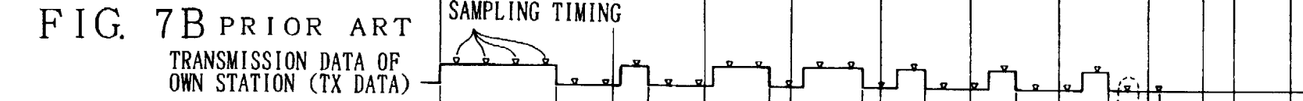
Figure 7C:
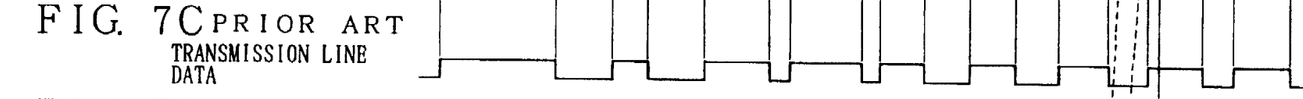
Figure 7D:
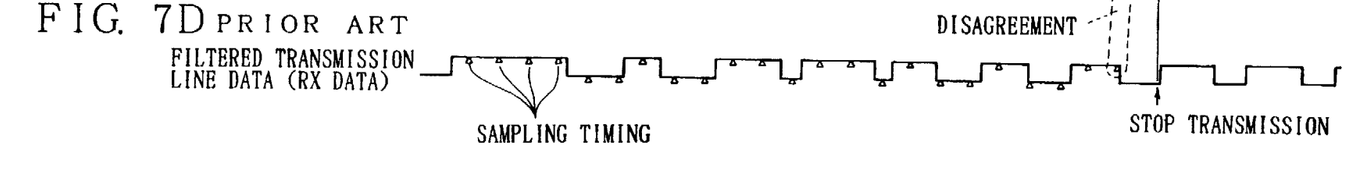

To be more concrete, in case the transmitted data from another station and the transmitted data of your own station (hereinafter it can be referred to just as a "own station") are respectively as shown in FIGS. 6B and 6C, and the rising edge of the another station appears a bit earlier than that of the own station, the data appearing on the transmission line (hereinafter just referred to as a transmission line data) will be as shown in FIG. 6D. This transmission line data is inputted to the own station by way of a digital filter and the data on the transmission line that has passed through the filter (which is called an RX data and can be referred to just as a filtered transmission line data) will be as shown in FIG. 6E after a predetermined period of time. The data of the own station (which is called a TX data and can be referred to just as a transmission data) is sampled respectively after t1, t2 and t3 period of time from the rising edge of each bit therein by the TX data sampling clocks as shown in FIG. 6G, and the RX data as the filtered transmission line data is sampled respectively after t1', t2' and t3' period of time from the rising edge of each bit therein by the RX data sampling clocks as shown in FIG. 6F.

The value obtained by sampling the TX data and that obtained by sampling the RX data are compared with each other at each of the trailing edges of the TX data sampling clocks of the own station, and when the values of those two data coincide with each other, the own station continues transmitting the data, whereas if the values do not coincide with each other, then the own station stops the transmission of data at a rising edge of the TX data sampling clock immediately after the judgment of disagreement, so that the another station continues transmitting the data.

The above method, however, is based on the fact that each phase within a bit corresponding to the priority judging code can be compared with that of another data. However, there is a difference between the timings when many stations start transmitting the data of their own due to the difference in the clock frequency of the respective stations, and also there is a transmission delay caused by the transmission line itself as well as a delay caused by the digital filter in which a noise or the like is removed, so that it is not an easy task to properly compare the phases in the bit corresponding to the priority code between the data transmitted from different stations.

Considering the case as shown in FIGS. 7A to 7D for example that the clock frequency of another station (FIG. 7A) is higher than that of the own station (FIG. 7B), the time length of one bit of the data from another station becomes shorter than that of the data from the own station, so that counting a first bit, second bit, third bit, and so forth . . . , this accumulated time difference becomes greater, and finally the bit format of the data on the transmission line (FIG. 7C) becomes rather queer, as a result of which the own station comes to stop transmitting the data even though it does not have to do so. By the way, it is to be noted that the triangle marks shown in FIGS. 7B and 7D indicate the sampling timings.

SUMMARY OF THE INVENTION

The present invention has been made to solve the above-mentioned problems, and accordingly, it is an object of the present invention to provide a data transmission system, wherein when more than two among a plurality of stations interconnected by one common transmission line try to communicate mutually by a start-stop transmission PWM mode, if the phases within a bit in the data of the own station and a corresponding bit of the data on the transmission line which has been received through a plurality of own station are compared and they coincide with each other as the result thereof, the own station continues transmitting the data, while otherwise it comes to stop transmitting, wherein even if there is a difference between the clock frequency of the own station and that of another station, the phases in the corresponding bits of the two different data can be smoothly compared.

In order to achieve the above objective, the present invention provides a data transmission system in which when more than two stations among a plurality of stations interconnected one another by a common transmission line simultaneously transmit the data of their own stations by a start-stop PWM transmission mode, phases within a bit in the transmission data (TX data) of the own station and a corresponding bit of the filtered transmission line data are compared, whereby in case they coincide with each other, the own station continues transmitting the TX data thereof, and it stops transmitting otherwise, wherein the data transmission system further comprises an external synchronizing means which, when a rising edge of the transmission data (RX data) is detected during the period in which the last phase of the data of the own station is being transmitted, forces to transmit the next bit of the transmission data in synchronization with the detection of the rising edge of the RX data.

In the above data transmission system, each of the stations further comprises: a transmission data sampling clock generating means for generating sampling clocks at a predetermined interval of time after a rising edge of each bit of the transmission data of the own station, a reception data sampling clock generating means for generating a sampling clock at predetermined intervals of time after a rising edge of the data on the transmission line which has been received through a filtering means, a transmission data generating means for generating the transmission data and phase signals of the transmission data, a transmission data sampling means for sampling the transmission data at the transmission data sampling clocks generated in the transmission data sampling clock generating means, a reception data sampling means for sampling the filtered transmission line data at the reception data sampling clocks generated in the reception data sampling clock generating means, and a comparing means for comparing the value sampled at the transmission data sampling means and that sampled at the reception data sampling means before the timing for sampling the next value of the transmission data, and generates a signal to stop transmitting the data of the own station at a timing for sampling the next transmission data if the compared values do not coincide with each other, wherein when the external synchronizing means detects a rising edge of the filtered transmission line data during a period in which the last phase of the transmission data being transmitted, it forces the transmission data generating means to start transmitting the next bit of the transmission data in synchronization with the detection of the rising edge of the filtered transmission line data.

With the construction above, when more than two stations among a plurality of stations interconnected one another by a common transmission line simultaneously transmit the data of their own stations by a start-stop PWM transmission mode, phases within a bit in the data of the own station and a corresponding bit of the data transmission line data that has passed through a filtering means that removes a noise or the like are compared, and if they coincide with each other, the own station continues transmitting the data thereof, and if not it stops transmitting to the contrary, so that there will be no conflict of data caused even if a plurality of stations simultaneously start transmitting the data of their own. Further, when the external synchronizing means detects a rising edge of the filtered transmission line data during the period in which the last phase of the transmission data of the own station is being transmitted, it forces to transmit the next bit of the transmission data in synchronization with the detection of the rising edge, so that the sampling clock of the own station and that of the filtered transmission line data can be adjusted during the period in which the last phase of the transmission data is being transmitted.

Further in each of the stations the transmission data sampling clock generating means generates sampling clocks at a predetermined interval of time after a rising edge of each bit of the transmission data of the own station, and the reception data sampling clock generating means generates sampling a clock at predetermined intervals of time after a rising edge of the transmission line data that has passed through the filtering means. The transmission data generating means generates the transmission data and phase signals of the transmission data, and the transmission data sampling means samples the transmission data at the transmission data sampling clocks generated in the transmission data sampling clock generating means, and further the reception data sampling means samples the filtered transmission data at the reception data sampling clocks generated in the reception data sampling clock generating means. In addition, the comparing means compares the value sampled in the transmission data sampling means and that sampled in the reception data sampling means before the timing for sampling the next value of the transmission data, and generates a signal to stop transmitting the data of the own station at a timing for sampling the next transmission data if the compared values do not coincide with each other, whereby there will be no conflict of data even though a plurality of stations transmit their own data.

Still further, the external synchronizing means detects a rising edge of the transmission line data that has passed through the filtering means during the period in which the transmission data generating means is transmitting the last phase of the data, and forces the transmission data generating means to start transmitting the next bit of the transmission data in synchronization with the timing of the detection of the rising edge, so that the sampling clock of the own station and that of the filtered transmission data can be adjusted while the last phase of the transmission data is being transmitted.

Other features and advantages of the invention will be apparent from the following description taken in connection with the accompanying drawings.

DETAILED DESCRIPTION OF THE PREFERRED EMBODIMENTS

Figure 1:
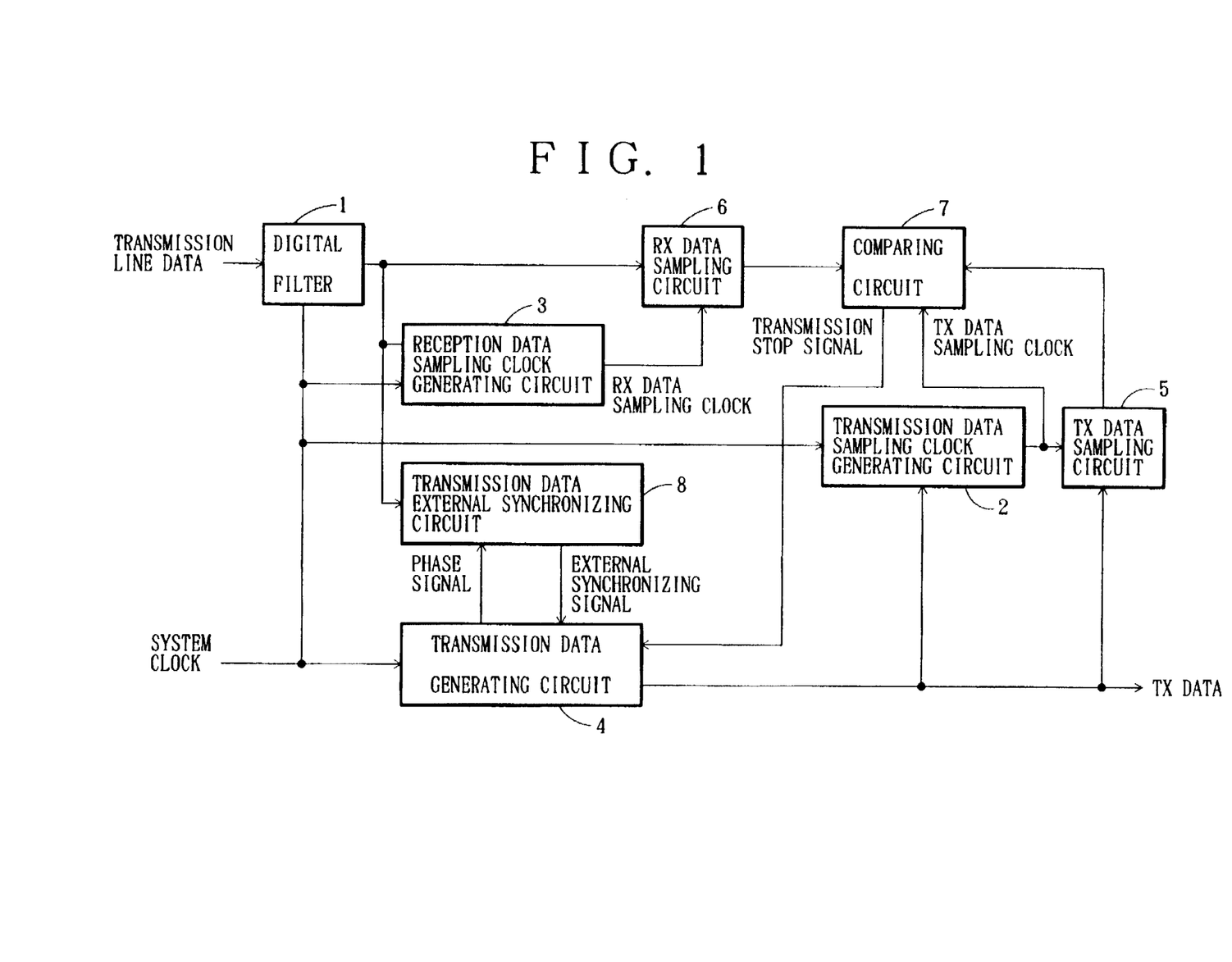
FIG. 1 is a block diagram showing one embodiment of a data transmission system of the present invention.

In the following, one embodiment of the present invention is explained in reference to the accompanied figures, wherein FIG. 1 is a block diagram showing an important circuit portion of the data transmission system of the present invention. In FIG. 1, reference numeral 1 denotes a digital filter for removing a noise in the data on the transmission line, which filter functions on the basis of the system clock of the own station and outputs an RX data which is a filtered noiseless transmission line data. In the same figure, reference numeral 2 denotes a transmission data sampling clock generating circuit as a means for generating sampling clocks respectively after t1, t2, and t3 period of time from the rising edge of each bit of the transmitted data (TX data) based on the system clock of the own station, and reference numeral 3 denotes a reception data sampling clock generating circuit for generating sampling clocks respectively after the period of t1', t2' and t3' based on the system clock of its own station from the rising edge of the filtered transmission line data (RX data). Reference numeral 4 denotes a transmission data generating circuit for generating transmission data that produces a transmission data and phase signals therein on the basis of the system clock of the own station. Reference numeral 5 denotes a TX data sampling circuit as a TX data sampling means for sampling the transmission data at the TX data sampling clocks from the transmission data sampling clock generating circuit 2, and numeral 6 denotes an RX data sampling circuit as an RX data sampling means for sampling the reception data at the RX data sampling clocks from the reception data sampling clock generating circuit 3, and 7 denotes a comparing circuit that compares the value sampled at the TX data sampling circuit 5 and that sampled at the RX data sampling circuit 6 before the timing for sampling the next TX data, and it generates a data transmission stopping signal for activating the own station to stop transmitting the data of the own station at a timing for sampling the next TX data if the compared data do not coincide with each other. Reference numeral 8 denotes an external synchronizing circuit as a means for externally synchronizing the transmission data of the own station, which circuit detects based on a phase signal from the transmission data generating circuit 4 whether or not there is a rising edge of the RX data during the period in which the phase 3 of the TX data is being sent, and generates a signal to activate the transmission data generating circuit 4 to forcibly start to transmit the next TX data in case the rising edge is found.

With the construction above, the operation of the illustrated circuit will now be explained in reference to the timing chart shown in FIGS. 2A to 2G indicating the state of each component of the circuit.

Figure 2A:
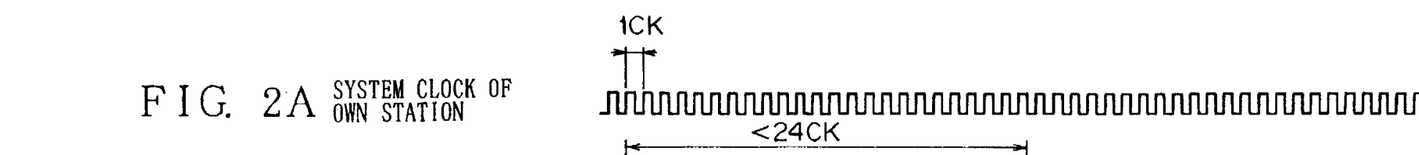
FIGS. 2A to 2G are timing charts explaining the timing for external synchronization observed in the data transmission system of FIG. 1.
Figure 2B:
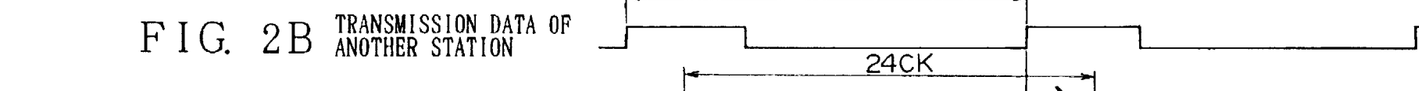

Now, the digital filter 1, the transmission data sampling clock generating circuit 2, the reception data sampling clock generating circuit 3 and the transmission data generating circuit 4 respectively operate based on the inputted signal fed from the system clock as shown in FIG. 2A. In this state, if another station transmits a transmission data as shown in FIG. 2B, and the own station transmits the transmission data (TX data) after a predetermined period of time from the data transmission of another station as shown in FIG. 2C, the data on the transmission line will be a logic "OR" of the transmission data of another station and that of the own station as shown in FIG. 2D, wherein either of the two data is at "H" level.

Figures 2C, 2D:
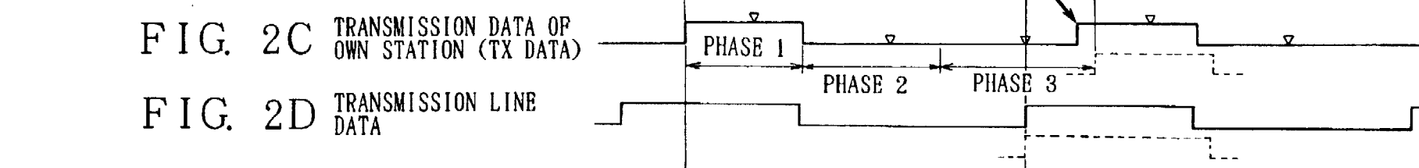
Figure 2E:
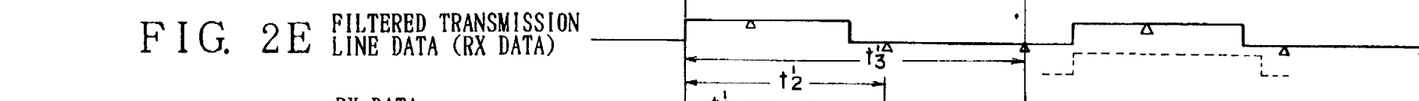
Figure 2F:
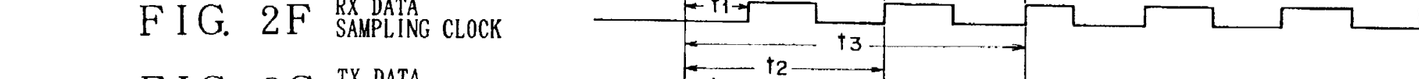

The transmission line data as shown in FIG. 2D is inputted to the RX data sampling circuit 6 by way of the digital filter 1, but it is delayed for a predetermined period of time by the filter, so that the transmission line data (RX data) that has passed the digital filter will be as shown in FIG. 2E. This RX data is sampled at the RX data sampling circuit 6 at the rising edges of the sampling clocks which are generated respectively after t1', t2' and t3' from the rising edge of the RX data in the reception data sampling clock generating circuit 3 as shown in FIG. 2F.

Figure 2G:
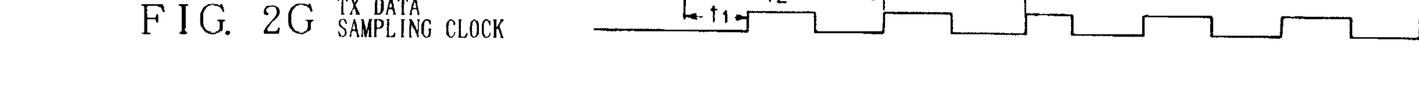

The data of the own station (TX data) is sampled in the TX data sampling circuit 5 at the rising edges of the sampling clocks which are generated respectively after t1, t2 and t3 from the rising edge of the TX data at the transmission data sampling clock generating circuit 2 as shown in FIG. 2G.

These sampled values of the RX data and the TX data are compared with each other at the comparing circuit 7, and the transmission data generating circuit 4 continues generating the transmission data of the own station and continues transmitting as long as the RX data and the TX data coincide with each other. However, if the transmission data external synchronizing circuit 8 detects a rising edge of the RX data during the period in which it acknowledges by a phase signal from the data generating circuit 4 that the last phase 3 of the TX data is being transmitted, it generates an external synchronizing signal at this timing and feeds it to the transmission data generating circuit 4.

The transmission data generating circuit 4 forcibly starts transmitting the next bit of the TX data in response to the external synchronizing signal, at the timing indicated by an arrow shown in FIG. 2C.

Accordingly, the sampling clocks generated by the transmission data sampling clock generating circuit 2 after the period of t1, t2 and t3 from the rising edge of the TX data synchronize with the sampling clocks generated by the reception data sampling clock generating circuit 3 after the period of t1', t2' and t3' from the rising edge of the RX data. It is to be noted that the waveforms shown by dotted lines in FIGS. 2C, 2D and 2E are for indicating the situation when there is no external synchronizing circuit 8 adopted.

Figure 3A:
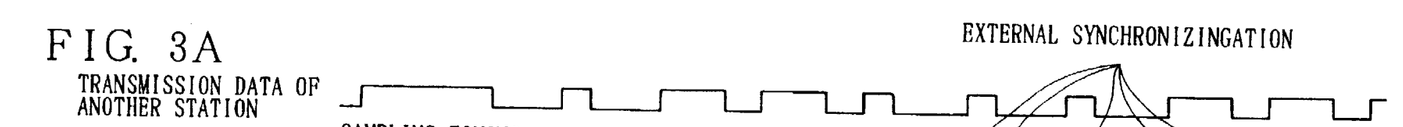
FIGS. 3A to 3D are respectively timing charts explaining the effect of the data transmission system of the present invention.
Figure 3B:
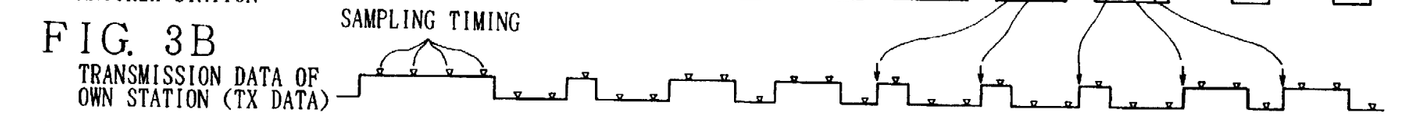
Figure 3C:
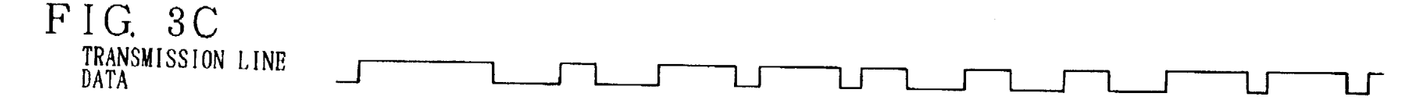
Figure 3D:
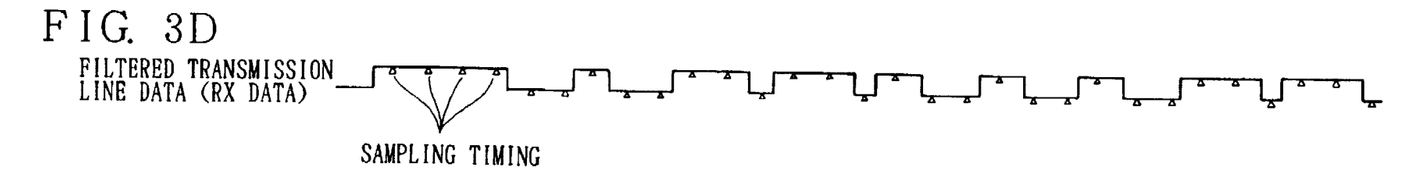

By the external synchronization as explained above, even if the clock frequency of another station is higher than that of the own station, the time length of one bit of the data of the another station (FIG.3A) is shorter than that of the own station (FIG. 3B), and accordingly even in the case that the more the incremented number of bit becomes, the accumulated discrepancy of the time length of each bit becomes greater, when the rising edge of the RX data is detected during the transmission of the phase 3 of the TX data, the transmission data external synchronizing circuit 8 generates an external synchronizing signal and inputs it to the transmission data generating circuit 4, whereby it starts transmitting the next bit of the TX data forcibly at the timing indicated by the arrow before mentioned. Thus, the data on the transmission line never forms a queer bit format which is far from a normal one, and in addition, it never happens that the data from the own station is stopped without a proper reason.

Subsequently, even though there is a difference of clock frequency between the own station and another station, each phase of the corresponding bits can be correctly compared.

It is to be noted that in the above embodiment, each element 1 to 8 in the block diagram is shown as a discrete circuit, it can be constructed by a microcomputer that functions in accordance with a predetermined control program.

[Effect of the Invention]

As mentioned heretofore, according to the present invention, since the timing of the sampling clock for sampling the transmission data of the own station and that for sampling the transmission line data filtered by a filtering means can be adjusted during the transmission of the phase 3, even though there is a difference between the clock frequency of the own station and that of other station, each phase of the corresponding bits of the respective data can be correctly compared.

Further, the transmission data external synchronizing circuit detects a rising edge of the transmission line data that has passed through the filtering means during the period in which the last phase of the transmission data of the own station is being transmitted, and generates a signal to forcibly start sending the next bit of the transmission data, so that the timing of the sampling clocks of the transmission data of the own station can be adjusted to that of the filtered transmission line data during the period in which the last phase is being transmitted, whereby even though there is a difference between the clock frequencies respectively of the own station and of another station, each phase of the corresponding bits can be correctly compared.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A data transmission system for communicating one station with other stations using a common data transmission line interconnected thereamong, wherein when more than two stations including the one station simultaneously transmit the data of their own stations by a start-stop PWM (Pulse-Width Modulation) transmission mode, the phases within a bit in the transmission data of the one station and a corresponding bit of the data on the transmission line which has been received through a noise filtering means of said one station are compared, wherein if they coincide with each other, the one station continues transmitting the transmission data of its own, whereas it stops transmitting otherwise, wherein said data transmission system further comprises:

an external synchronizing means which, when a rising edge of the filtered transmission line data is detected during the period in which the last phase of the transmission data of the one station is being transmitted, said external synchronization means forces to start transmitting the next bit of the transmission data in synchronization with the timing of said detection of a rising edge of the filtered transmission line data.

2. A data transmission system as claimed in claim 1, wherein each of said stations further comprises;

a transmission data sampling clock generating means for generating sampling clocks at a predetermined interval of time after a rising edge of each bit of the transmission data of said one station, a reception data sampling clock generating means for generating a sampling clock at predetermined intervals of time after a rising edge of the data on the transmission line which has been received through the filtering means, a transmission data generating means for generating the transmission data and phase signals of the transmission data, a transmission data sampling means for sampling the transmission data at sampling clocks generated in said transmission data sampling clock generating means, a reception data sampling means for sampling said filtered transmission line data at sampling clocks generated in said reception data sampling clock generating means, and a comparing means for comparing the value sampled in said transmission data sampling means and that sampled in said reception data sampling means before the timing for sampling the next value of the transmission data, and generates a signal to stop transmitting the data of the one station at a timing for sampling the next transmission data if said compared values do not coincide with each other, wherein when the external synchronizing means detects a rising edge of said filtered transmission line data during the period in which said transmission data generating means is transmitting the last phase of the transmission data, said external sychronization means forces the transmission data generating means to start transmitting the next bit in the transmission data in synchronization with the detection of the rising edge of said filtered transmission line data.

3. A data transmission method for communicating one station with other stations using a common data transmission line interconnected thereamong, wherein when more than two stations including the one station simultaneously transmit the data of their own station by a start-stop PWM (Pulse-Width Modulation) transmission mode, the phases within a bit in the transmission data of the one station and a corresponding bit of the data on the transmission line which has been received through a filtering means of said one station are compared, wherein if they coincide with each other, the one station continues transmitting the transmission data of its own, whereas it stops transmitting otherwise, wherein said data transmission method comprises the steps of;

receiving the data on the transmission line through a filtering means of the one station, sampling the transmission data in a transmission data sampling means at sampling clocks generated in a transmission data sampling clock generating means, sampling the received data through the filtering means in a reception data sampling means at sampling clocks generated in a reception data sampling clock generating means, comparing the value sampled in the transmission data sampling means and that sampled in the reception data sampling means before the timing for sampling the next value of the transmission data, generating a signal to stop transmitting the data of the one station at a timing for sampling the next transmission data if said compared values do not coincide with each other, and forcing the transmission data generating means to start transmitting the next bit in the transmission data in synchronization with a detection of the rising edge of an filtered transmission line data, when the external synchronizing means detects the rising edge of said filtered transmission line data even during the period in which the last phase of the transmission data is being transmitted.

* * * * *